Dec. 12, 1933.  W. H. PAULSON  1,939,315
CONVEYER APPARATUS
Filed Nov. 2, 1932  2 Sheets-Sheet 1
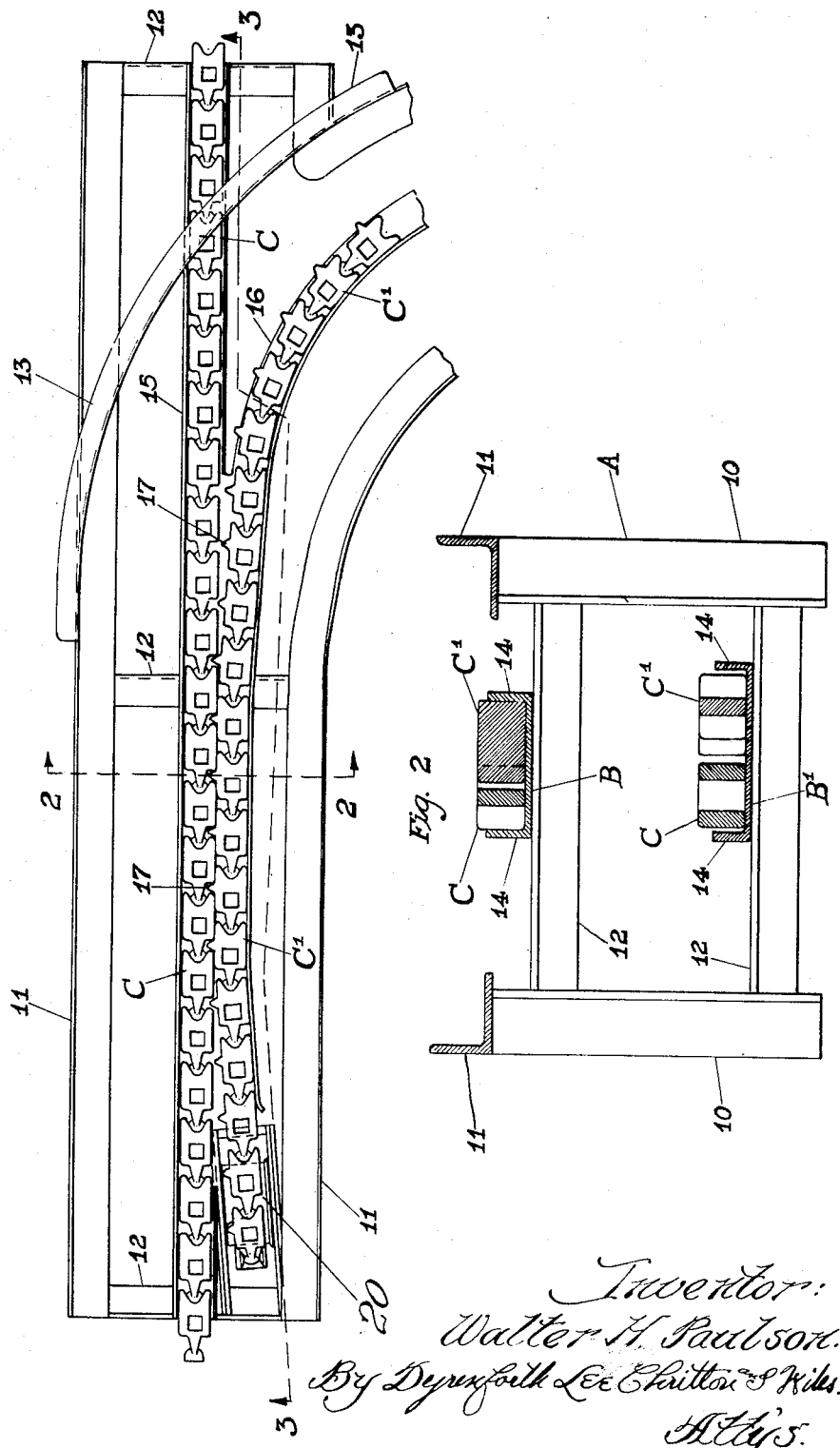

Dec. 12, 1933.   W. H. PAULSON   1,939,315
CONVEYER APPARATUS
Filed Nov. 2, 1932   2 Sheets-Sheet 2
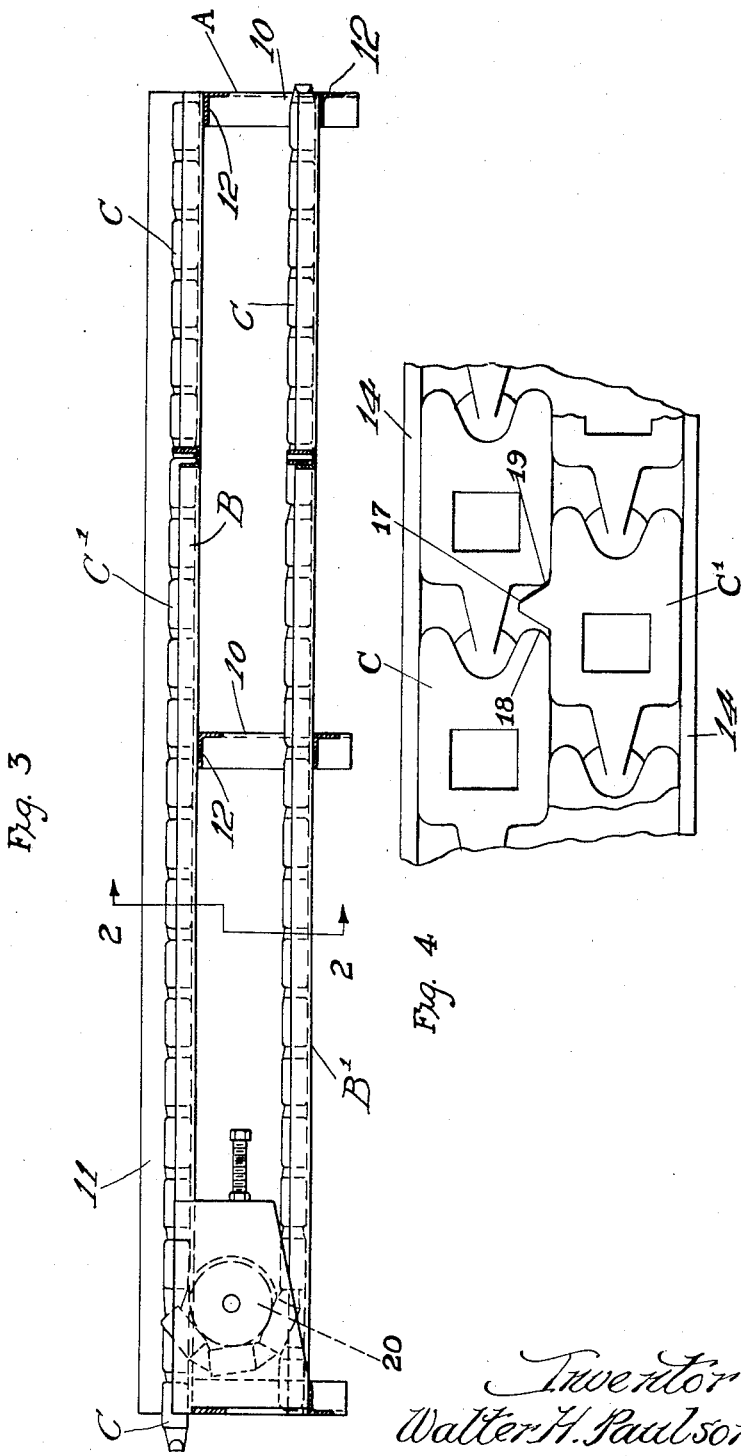

Patented Dec. 12, 1933

1,939,315

UNITED STATES PATENT OFFICE 1,939,315

CONVEYER APPARATUS

Walter H. Paulson, Chicago, Ill., assignor to Harry D. Lathrop, Chicago, Ill.

Application November 2, 1932. Serial No. 640,376

4 Claims. (Cl. 198—203)

This invention relates to conveyer apparatus and is particularly useful in connection with chain conveyers.

An object of the invention is to provide conveyer apparatus of simple and sturdy construction in which a plurality of chains are driven by means of interlocking chain connections. A further object is to provide conveyer apparatus having a plurality of angularly related chains and in which portions of the chains are brought together in a flexible rack-and-gear relation so that one chain directly drives another. Other specific objects and advantages will appear as the specification proceeds.

The invention is illustrated, in its preferred embodiment, by the accompanying drawings, in which—

Fig. 1 is a plan view of a portion of the conveyer apparatus embodying my invention; Fig. 2, a transverse sectional view, the section being taken as indicated at line 2 of Figs. 1 and 3; Fig. 3, a side view in elevation and part-sectional view, the view being taken as indicated at line 3 of Fig. 1 and the transverse guide rail being removed; and Fig. 4, a broken enlarged plan view of a portion of the interlocking chains.

In the illustration given, A designates the conveyer frame; B and B' designate respectively the upper and lower chain tracks; and C and C' designate a pair of chains carried by tracks B and B'.

The frame A may be of any suitable construction. In the illustration given, vertical standards 10 support on their tops the angle irons 11 which afford tracks as well as side rails for the cases, cans, or other articles which may be carried by the conveyer. Extending between the standards 10 are spaced supports or cross beams 12 (illustrated in the form of angle irons). The cross beams 12 support the upper track B and the lower track B'. The frame A preferably provides two or more case or article tracks which are brought together in angular relation, as shown more clearly in Fig. 1. To cause the article being conveyed to leave the main track and travel along the angularly disposed track, a transverse guide rail 13 may be employed. If desired, this rail may be pivoted so that it may be swung to one side to permit the article to travel along the main or straight track or, at the operator's option, may be swung across the main track (as illustrated in Fig. 1) to direct the article along the curved or angularly disposed track.

The upper and lower chain-tracks may also be of any suitable construction. The tracks are preferably provided with side rails 14. In the illustration given, the upper track B is relatively narrow so as to confine the chains C and C' in close or meshing relation, while the lower track B' is relatively wide and permits the chains to travel independently of each other. Each of the tracks B and B' are formed by the merging of individual chain tracks 15 and 16. The individual track 15, which communicates with both tracks B and B', is shown, with respect to the portion of the chain illustrated in Fig. 1, substantially straight, while the individual track 16, in the portion of the apparatus illustrated, is shown to be curved or tangential to track 15. In the complete apparatus, of course, the tracks form a continuous loop in which the continuous chains C and C' are supported and guided.

The chains C and C' may be of any suitable construction. In the illustration given, the chain C is composed of links of a type described and claimed in my Patent No. 1,861,642, which issued on June 7, 1932. The chain C' is also substantially the same in construction as chain C except that the links forming chain C' are provided with lateral extensions or teeth 17. It will be observed that when the chains C and C' are brought into juxtaposition, as illustrated more clearly in Figs. 1 and 4, the lateral projections 17 extend between shoulders 18 and 19 afforded by the links of chain C and thus connect the two chains. The conveyer chain C' is illustrated as extending around a wheel or pulley 20 which is of well known construction and which is supported by frame A. It will be understood, however, that the chain might be extended along a curved track at this point and without engaging a pulley wheel.

Any suitable source of power, as for example, a motor (not shown), may be employed to drive chain C or chain C'.

In the operation of the conveyer, when one of the chains C or C' is driven, the interlocking connections between the portions of the chains C and C' which are held in juxtaposition by the upper track B, cause the two chains to move together. The spaced teeth 17 on the chain C' engage the recesses between shoulders 18 and 19 of the links in chain C and afford a flexible rack-and-gear connection. At the same time, the angular relation of chain C' to the chain C enables the lateral projections or teeth 17 to enter and leave the recesses between the links of chain C without clashing. It will be observed that the teeth 17, at the points where they enter and leave the recesses, follow a curved path, thus permitting an easy meeting and separating of the interlocking parts of the two chains.

While in the illustration given, I have shown one driving chain and one driven chain, it will be understood that additional chains may be driven by either of the two chains illustrated. Also, the angles at which the chains meet may be greatly modified to meet the requirements of a particular conveyer. While, in the specification, I have used the word "chain" as descriptive of the form of conveyer illustrated, it will be understood that other forms of flexible conveyers are included in my invention, and by the use of the word "chain" in the accompanying claims, I intend this broader meaning of the term.

The foregoing detailed description has been given for clearness of understanding only, and no unnecessary limitations should be understood therefrom, but the appended claims should be construed as broadly as permissible, in view of the prior art.

I claim:

1. In apparatus of the character set forth, a a track, a conveyer chain supported thereon and provided with spaced shoulders, a second chain also supported by said track and equipped with lateral projections, said track being provided with side walls maintaining said chains in adjacent relation so that said lateral projections and shoulders are in meshing relation, and means for driving one of said chains.

2. In apparatus of the character set forth, a track, a conveyer chain mounted thereon, a curved track tangential to said first track and merging therewith, a second chain carried by said curved track, said chains being provided with interlocking connections, and means for driving one of said chains.

3. In apparatus of the character set forth, a track, a continuous chain carried thereby, a second track, a continuous chain carried by said second track, said tracks being merged for a space into a single track so as to confine said chains in juxtaposed relation, interlocking elements on said chains adapted to be brought into operative engagement when the chains are brought into adjacent relation, and means for driving one of said chains.

4. In apparatus of the character set forth, a track, a pair of conveyer chains slidably mounted thereon, said chains being provided with interlocking connections, and means for driving one of said chains.

WALTER H. PAULSON.